March 6, 1956     P. E. CURTS     2,737,304
WIRE REEL LOADING AND UNLOADING ATTACHMENT FOR VEHICLES
Filed Oct. 27, 1952     2 Sheets-Sheet 1

Paul E. Curts
INVENTOR.

March 6, 1956 P. E. CURTS 2,737,304
WIRE REEL LOADING AND UNLOADING ATTACHMENT FOR VEHICLES
Filed Oct. 27, 1952 2 Sheets-Sheet 2
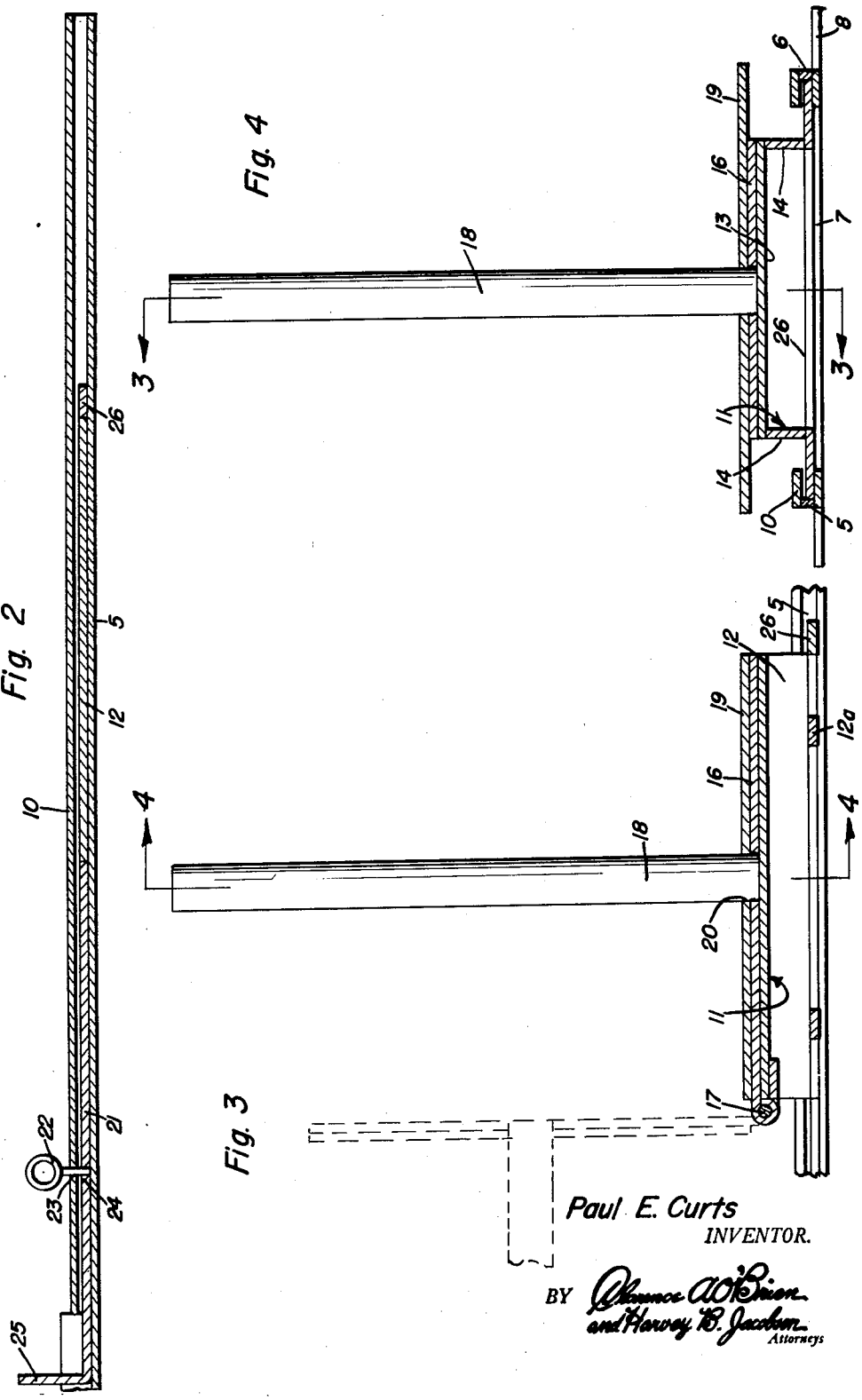
Paul E. Curts
INVENTOR.

United States Patent Office 2,737,304
Patented Mar. 6, 1956

2,737,304

WIRE REEL LOADING AND UNLOADING ATTACHMENT FOR VEHICLES

Paul E. Curts, Baker, Oreg.

Application October 27, 1952, Serial No. 317,037

2 Claims. (Cl. 214—83.24)

The present invention relates to new and useful improvements in apparatus for easily loading and unloading wire reels from work trucks.

An important object of the invention is to provide an apparatus of this character whereby a heavy wire reel may be loaded onto or unloaded from a truck by a single workman.

More specifically the invention embodies a pair of rails adapted for attaching to the bed of a truck and on which a stand is slidable, and providing the stand with a tiltable post to facilitate placing in the hub of a reel, after which the reel may be swung upright on the stand.

Another object is to provide a device of this character of simple practical construction, which is efficient and reliable in operation, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, in which:

Figure 2 is an enlarged longitudinal sectional view taken on a line 2—2 of Figure 1.

Figure 3 is an enlarged vertical sectional view of the stand taken on a line 3—3 of Figure 4, and Figure 4 is a similar view taken on line 4—4 of Figure 3.

Figure 1:
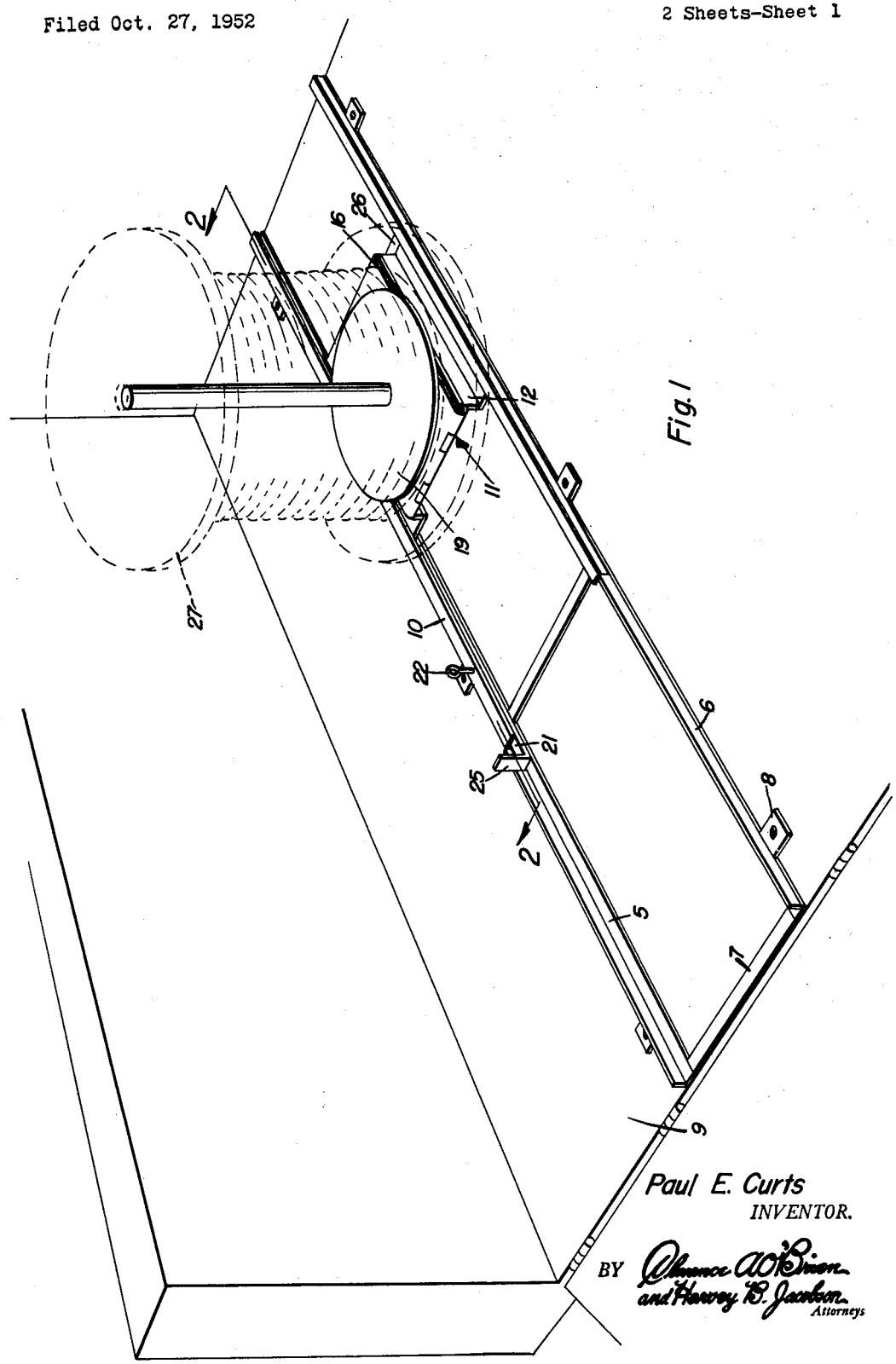
Figure 1 is a perspective view.

Referring now to the drawings in detail, wherein for the purpose of illustration I have disclosed a preferred embodiment of my invention, the numerals 5 and 6 designate a pair of angle iron rails rigidly connected to each other by cross bars 7 and the rails are provided with attaching ears 8 by means of which the rails may be attached to the bed 9 of a truck.

A top flange 10 is welded on the rear portion of each rail to provide a channel shaped construction for the rails.

A stand 11 is constructed of a pair of angle iron side members 12 braced by cross-bars 12a and a platform 13 is welded on the upstanding flanges 14 of the side members, while the horizontal flanges 15 are slidable in the channeled rear portion of the rails. A hinge plate 16 is co-extensive in area with platform 13 and is hingedly connected thereto at the front edge of the platform by one or more hinge pins 17 for swinging the hinge plate upwardly. A post 18 is welded in an upright position to the center of hinge plate 16 and a turntable 19 is formed with a central opening 20 to receive the post for placing the turntable on the hinge plate for rotation thereon.

A locking bar 21 is adapted for placing longitudinally in the channeled portion of one of the rails to abut and lock the stand 11 in its rearward position on the rails and the bar is locked to the rails by a pin 22 inserted in alined openings 23 and 24 in the flange 10 of the rail and in the locking bar 21. The outer end of the locking bar is formed with an upstanding handle 25.

A cross bar 26 is welded in the channels of the rails to form a rear stop for the stand.

In the operation of the device, the stand 11 is moved forwardly on the rails 5 and 6 and post 18 is tilted downwardly and in a forward direction to enter the hub of a wire reel 27, after which the reel is up-ended to rest on the turntable 19. The stand, with the reel supported thereon, may then be moved rearwardly on the rails and locked by the bar 21. The turntable 19 is free to turn on the platform of the stand while winding or unwinding wire on the reel.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A wire reel loading and unloading attachment comprising a pair of rails having opposed channels rigidly connected to each other and adapted for mounting as a unitary structure on the bed of a truck, a platform having its side edges positioned in said channels for traveling therein, a post tiltably carried by the platform and adapted to enter the hub of a reel supported on the platform, and stop means in the channel of at least one of the rails and engaging the platform to hold the latter immovable on the rails.

2. A wire reel loading and unloading attachment for vehicles comprising a pair of rails rigidly connected to each other and adapted for mounting as a unitary structure on the bed of a vehicle, a platform mounted for traveling in the channels of the rails, a post, means pivotally connecting the lower end of the post centrally to the platform for swinging the post vertically, a turntable rotatably supported on the platform and having a central opening in which the post is positioned, said post being adapted to enter the hub of a reel to upend the reel onto the turntable, and a stop slidable longitudinally in the channel of at least one of the rails and manipulated at one end of the latter into and out of the path of movement of the platform to hold the latter immovable.

References Cited in the file of this patent

UNITED STATES PATENTS

| | | |
|---|---|---|
| 878,751 | Schreiber | Feb. 11, 1908 |
| 1,701,045 | Kraus | Feb. 5, 1929 |
| 1,866,640 | Fontaine | July 12, 1932 |
| 1,868,562 | Chubb et al. | July 26, 1932 |
| 2,156,424 | Barnard | May 2, 1939 |
| 2,193,765 | Krengel | Mar. 12, 1940 |
| 2,411,821 | Choat | Nov. 26, 1946 |
| 2,437,806 | Dempster | Mar. 16, 1948 |
| 2,677,476 | Bebinger | May 4, 1954 |